United States Patent
Kozorovitzky et al.

(10) Patent No.: US 12,045,669 B2
(45) Date of Patent: Jul. 23, 2024

(54) EXECUTION OF A SYNCHRONOUS OPERATION IN AN ASYNCHRONOUS OPERATIONAL ENVIRONMENT

(71) Applicant: MICRO FOCUS LLC, Santa Clara, CA (US)

(72) Inventors: Boris Kozorovitzky, Yehud (IL); Kobi Gana, Yehud (IL); Marina Gofman, Yehud (IL)

(73) Assignee: Micro Focus LLC, Santa Clara, CA (US)

(*) Notice: Subject to any disclaimer, the term of this patent is extended or adjusted under 35 U.S.C. 154(b) by 176 days.

(21) Appl. No.: 17/127,130

(22) Filed: Dec. 18, 2020

(65) Prior Publication Data
US 2022/0197720 A1 Jun. 23, 2022

(51) Int. Cl.
G06F 9/46 (2006.01)
G06F 9/48 (2006.01)
G06F 9/52 (2006.01)

(52) U.S. Cl.
CPC .......... G06F 9/526 (2013.01); G06F 9/4881 (2013.01); G06F 9/522 (2013.01)

(58) Field of Classification Search
CPC ......... G06F 9/526; G06F 9/4881; G06F 9/522
USPC ....................................................... 718/100
See application file for complete search history.

(56) References Cited

U.S. PATENT DOCUMENTS

| | | | | |
|---|---|---|---|---|
| 10,628,189 | B2* | 4/2020 | Kazak | G06F 9/45525 |
| 2003/0182408 | A1* | 9/2003 | Hu | H04L 67/08 |
| | | | | 714/E11.193 |
| 2006/0146844 | A1* | 7/2006 | Szabo | H04L 51/234 |
| | | | | 370/252 |
| 2012/0198471 | A1* | 8/2012 | Kukanov | G06F 9/526 |
| | | | | 718/108 |
| 2013/0290583 | A1* | 10/2013 | Dice | G06F 9/526 |
| | | | | 710/200 |
| 2016/0077775 | A1* | 3/2016 | Komaki | G06F 3/126 |
| | | | | 358/1.15 |
| 2019/0324783 | A1* | 10/2019 | Kazak | G06F 9/542 |
| 2020/0142758 | A1* | 5/2020 | Norris | G06F 9/542 |

* cited by examiner

Primary Examiner — Bradley A Teets
(74) Attorney, Agent, or Firm — Sheridan Ross P.C.

(57) ABSTRACT

A method for execution of a synchronous operation in an asynchronous operational environment includes receiving, by a processor, a first operation from program code executing within the asynchronous operational environment with the program code being run on an execution thread and a communication thread. The method also includes determining, by the processor, if the first operation is a synchronous operation. The method further includes that if the first operation is a synchronous operation, sending a request from the execution thread to the communication thread to perform the first operation and blocking execution of a subsequent operation until a response to the request from the communication thread for the first operation has been completed.

20 Claims, 11 Drawing Sheets

EXECUTION OF A SYNCHRONOUS OPERATION IN AN ASYNCHRONOUS OPERATIONAL ENVIRONMENT

FIELD OF THE DISCLOSURE

Embodiments of the present disclosure relate generally to methods and systems for sharing resources and more particularly to sharing resources in a synchronous operation in the context of an asynchronous operational environment.

BACKGROUND

A computer programming language is a formal language used by a computer to create computer programs to be executed by the computer to perform desired tasks. In the context of a client-server environment, such as a client computer running a web browsing program that accesses a web site over the Internet that is hosted by a server computer, program code of the computer programs may be executed at the client (i.e., "client-side"), or at the server (i.e., "server-side"). An example of a programming language is JavaScript. JavaScript includes JavaScript code that has been traditionally executed on the client-side, but runtime environments like the Node.js runtime environment has enabled JavaScript code to be executed on the server-side.

A computer typically executes the program code of a computer program in a synchronous manner but may also execute the program code asynchronously. For example, if there is a first operation followed by a second operation within the program code, synchronous execution means that the second operation is not executed until after the first operation has been completed. By comparison, in an asynchronous operation, once execution of the first operation has been initiated, execution of the second operation is initiated, even if the first operation has not been completed. The Node.js runtime environment defaults to asynchronous execution, using a single-threaded event-driven programming model. Regarding highly CPU intensive applications however, the Node.js runtime environment employs worker threads to perform these tasks.

BRIEF SUMMARY

Embodiments of the present disclosure provide systems and methods for execution of a synchronous operation in the context of an asynchronous operational environment. According to one embodiment of the present disclosure, a method for execution of a synchronous operation in an asynchronous operational environment includes receiving, by a processor, a first operation from program code executing within the asynchronous operational environment with the program code being run on an execution thread and a communication thread. The method also includes determining, by the processor, if the first operation is a synchronous operation. The method further includes that if the first operation is a synchronous operation, sending a request from the execution thread to the communication thread to perform the first operation and blocking execution of a subsequent operation until a response to the request from the communication thread for the first operation has been completed.

Aspects of the above method for execution of a synchronous operation in an asynchronous operational environment include if the first operation is not a synchronous operation, sending a request from the execution thread to the communication thread to perform the first operation and allowing execution of a subsequent operation, regardless if a request from the communication thread of the first operation has been completed.

Aspects of the above method for execution of a synchronous operation in an asynchronous operational environment include the request is sent from the execution thread to the communication thread through a dual data buffer for the execution thread and the communication thread for the synchronous operation and the dual data buffer is always locked during the synchronous operation.

Aspects of the above method for execution of a synchronous operation in an asynchronous operational environment include receiving on a message channel from the execution thread to the communication thread, data from the request, reading, by the processor, the data from an active mutex of the execution thread, unlocking, by the processor, the active mutex of the execution thread for writing, swapping, by the processor, the active mutex and a passive mutex of the execution thread, locking, by the processor, the active mutex of the execution thread for writing and unlocking, by the processor, the active mutex of the execution thread for reading.

Aspects of the above method for execution of a synchronous operation in an asynchronous operational environment include locking, by the processor, the active mutex for the execution thread for writing and unlocking the active mutex for the execution thread for reading at an initialization stage.

Aspects of the above method for execution of a synchronous operation in an asynchronous operational environment include receiving on a message channel from the execution thread to the communication thread data of the request, writing, by the processor, the data into an active mutex of the communication thread, locking, by the processor, a passive mutex of the communication thread for reading and writing, unlocking, by the processor, the active mutex of the communication thread for writing, swapping, by the processor, the active mutex with the passive mutex of the communication thread and outputting, by the processor, the data to a shared resource.

Aspects of the above method for execution of a synchronous operation in an asynchronous operational environment include locking, by the processor, the active mutex for the communication thread for reading and writing at an initialization stage.

According to another embodiment of the present disclosure, a system comprises a processor and a memory storing instructions executable by the processor to receive a a first operation from program code executing within an asynchronous operational environment, the program code being run on an execution thread and a communication thread. The instructions are executable by the processor to further determine if the first operation is a synchronous operation sending a request from the execution thread to the communication thread to perform the first operation and blocking execution of a subsequent operation until a response to the request from the communication thread for the first operation has been completed.

Aspects of the above system include the instructions executable by the processor to further send a request from the execution thread to the communication thread to perform the first operation and allowing execution of a subsequent operation, regardless if a request from the communication thread of the first operation has been completed, if the first operation is not a synchronous operation.

Aspects of the above system include the asynchronous operational environment include the request is sent from the execution thread to the communication thread through a dual data buffer for the execution thread and the communication thread for the synchronous operation and the dual data buffer is always locked during the synchronous operation.

Aspects of the above system include the instructions executable by the processor to further receive on a message channel from the execution thread to the communication thread, data from the request, read the data from an active mutex of the execution thread, unlock the active mutex of the execution thread for writing, swap the active mutex with a passive mutex of the execution thread, lock the active mutex of the execution thread for writing and unlock the active mutex of the execution thread for reading.

Aspects of the above system include the instructions executable by the processor to further lock the active mutex for the execution thread for writing and unlock the active mutex for the execution thread for reading at an initialization stage.

Aspects of the above system include the instructions executable by the processor to further receive on a message channel from the execution thread to the communication thread, data from the request, write the data into an active mutex of the communication thread, lock a passive mutex of the communication thread for reading and writing, unlock the active mutex of the communication thread for writing, swap the active mutex with the passive mutex of the communication thread and output the data to a shared resource.

Aspects of the above system include the instructions executable by the processor to further lock the active mutex for the communication thread for reading and writing at an initialization stage.

According to yet another embodiment of the present disclosure, a non-transitory computer-readable data storage medium storing instructions executable by a processor to receive a first operation from program code executing within an asynchronous operational environment, the program code being run on an execution thread and a communication thread, determine if the first operation is a synchronous operation and if the first operation is a synchronous operation, sending a request from the execution thread to the communication thread to perform the first operation and blocking execution of a subsequent operation until a response to the request from the communication thread for the first operation has been completed.

Aspects of the above non-transitory computer-readable data storage medium include the instructions are executable by the processor to further send a request from the execution thread to the communication thread to perform the first operation and allowing execution of a subsequent operation, regardless if a request from the communication thread of the first operation has been completed, if the first operation is not a synchronous operation.

Aspects of the above non-transitory computer-readable data storage medium include the asynchronous operational environment include the request is sent from the execution thread to the communication thread via a dual data buffer for the execution thread and the communication thread for the synchronous operation and the dual data buffer is always locked during the synchronous operation.

Aspects of the above non-transitory computer-readable data storage medium include the instructions are executable by the processor to further receive on a message channel from the execution thread to the communication thread, data from the request, read the data from an active mutex of the execution thread, unlock the active mutex of the execution thread for writing, swap the active mutex with a passive mutex of the execution thread, lock the active mutex of the execution thread for writing and unlock the active mutex of the execution thread for reading.

Aspects of the above non-transitory computer-readable data storage medium include the instructions are executable by the processor to further lock the active mutex for the execution thread for writing and unlock the active mutex for the execution thread for reading at an initialization stage.

Aspects of the above non-transitory computer-readable data storage medium include the instructions are executable by the processor to further receive on a message channel from the execution thread to the communication thread, data from the request, write the data into an active mutex of the communication thread, lock a passive mutex of the communication thread for reading and writing, unlock the active mutex of the communication thread for writing, swap the active mutex with the passive mutex of the communication thread and output the data to a shared resource.

Figure 1:
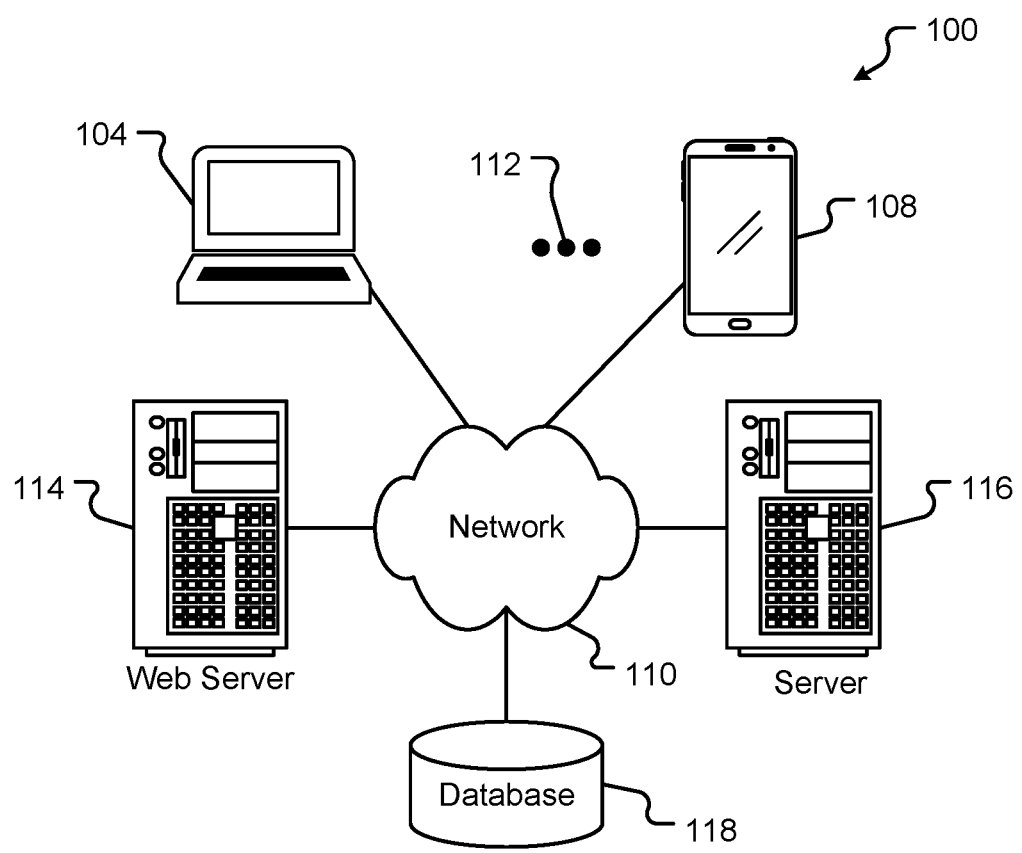
FIG. 1 is a block diagram illustrating elements of an example computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides example embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the example embodiments will provide those skilled in the art with an enabling description for implementing an example embodiment. It should however be appreciated that the present disclosure may be practiced in a variety of ways beyond the specific detail set forth herein.

While the example aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C." "A, B, and/or C," and "A. B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Example hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® 15-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an example computing environment 100 in which embodiments of the present disclosure may be implemented. More specifically, this example illustrates a computing environment 100 that may function as the servers, user computers, or other systems provided and described herein. The environment 100 includes one or more user computers, or computing devices, such as a computer 104, a communication device 108, and/or more 112. The computers 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computers 104, 108, 112 may also have any of a variety of applications, including for example, database client and/or server applications, and web browser applications. Alternatively, the computers 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the example computer environment 100 is shown with two computers, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like.

Merely by way of example, the network 110 may be a Local Area Network (LAN), such as an Ethernet network, a Token-Ring network and/or the like, a wide-area network; a virtual network, including without limitation a Virtual Private Network (VPN); the Internet; an intranet; an extranet, a Public Switched Telephone Network (PSTN), an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computers 104, 108, 112. The web server 114 can be running an operating system including any of those discussed above, as well as any commercially available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 14 may publish operations available operations as one or more web services.

The environment 100 may also include one or more file and or/application servers 116, which can, in addition to an operating system, include one or more applications accessible by a client running on one or more of the computers 104, 108, 112. The server(s) 116 and/or 114 may be one or more general purpose computers capable of executing programs or scripts in response to the computers 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computer 104, 108, 112.

The web pages created by the server 114 and/or 116 may be forwarded to a computer 104, 108, 112 via a web (file) server 114, 116. Similarly, the web server 114 may be able to receive web page requests, web services invocations, and/or input data from a computer 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
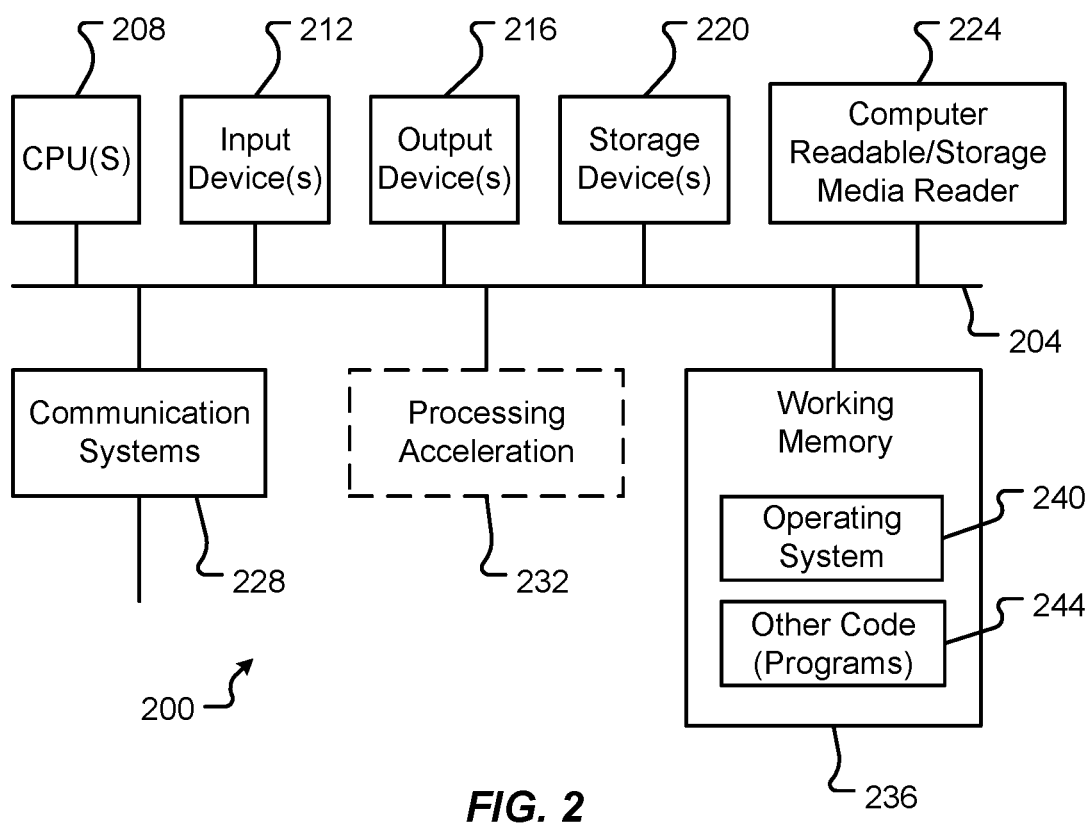
FIG. 2 is a block diagram illustrating elements of an example computing system in which embodiments of the present disclosure may be implemented.

FIG. 2 is a block diagram illustrating elements of an example computing system 200 in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computers such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926FJ-S™ processors, other industry-equivalent processors, and may perform computational functions using any known or future-developed standard, instruction set, libraries, and/or architecture.

Figure 3:
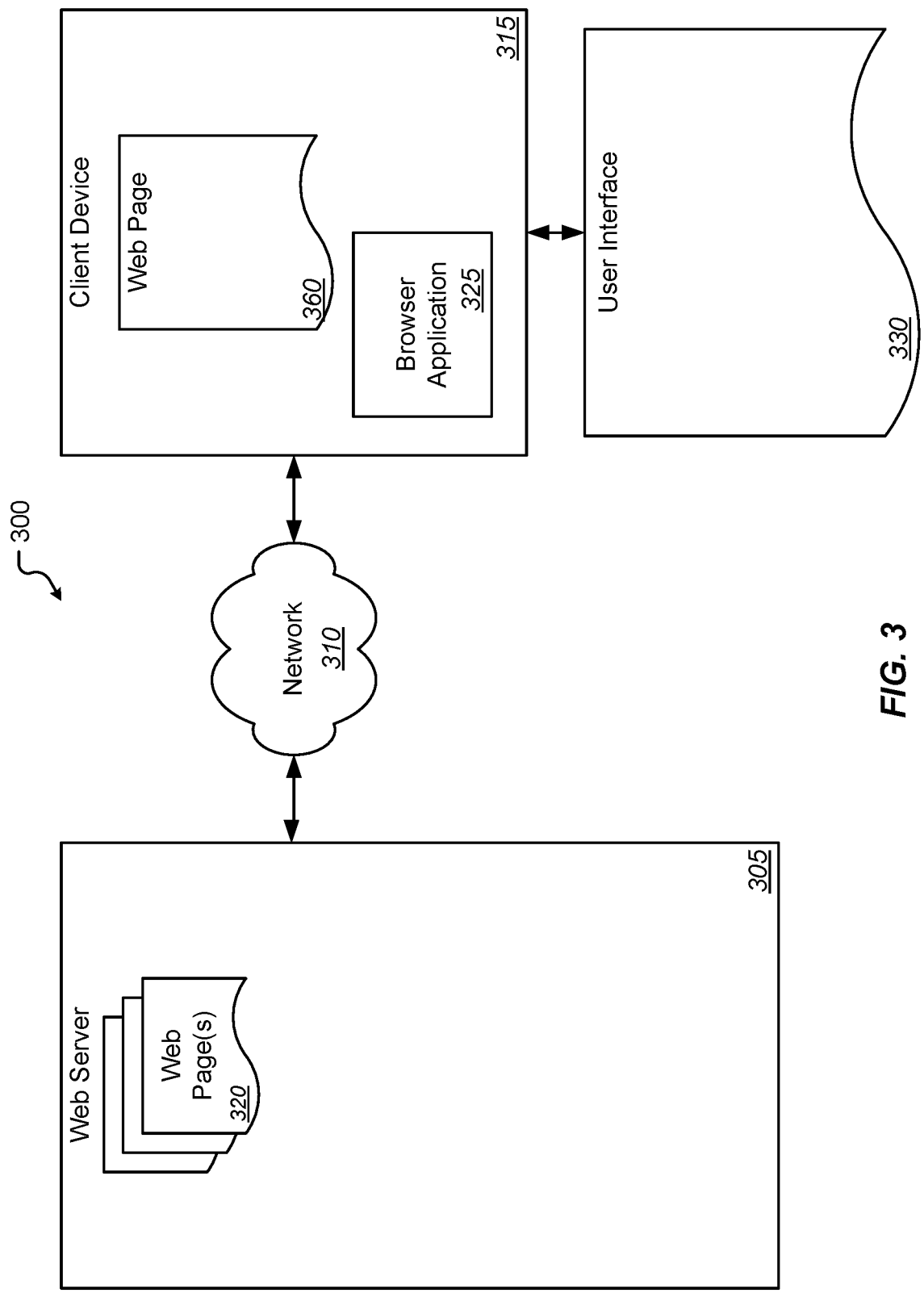
FIG. 3 is a block diagram illustrating an example environment for implementing resource sharing according to one embodiment of the present disclosure.

FIG. 3 is a block diagram illustrating an example environment for implementing resource sharing according to one embodiment of the present disclosure. As illustrated in this example, the environment 300 can comprise a web server 305 such as described above communicatively coupled with one or more communication networks 310 including any one or more wired and/or wireless local and/or wide area networks as also described above. The environment 300 can also comprise a client device 315 communicatively coupled with the communications network(s) 310. The client device 315 can comprise any of a variety of computers such as described above.

Generally speaking, the web server 305 can maintain a set of web pages 320 to be provided to the client device 315 over the communication network(s) 310 as known in the art. Also as known in the art, the client device 315 can execute a browser application 325 which can receive and render the web pages 320 as a user interface 330.

Figure 4:
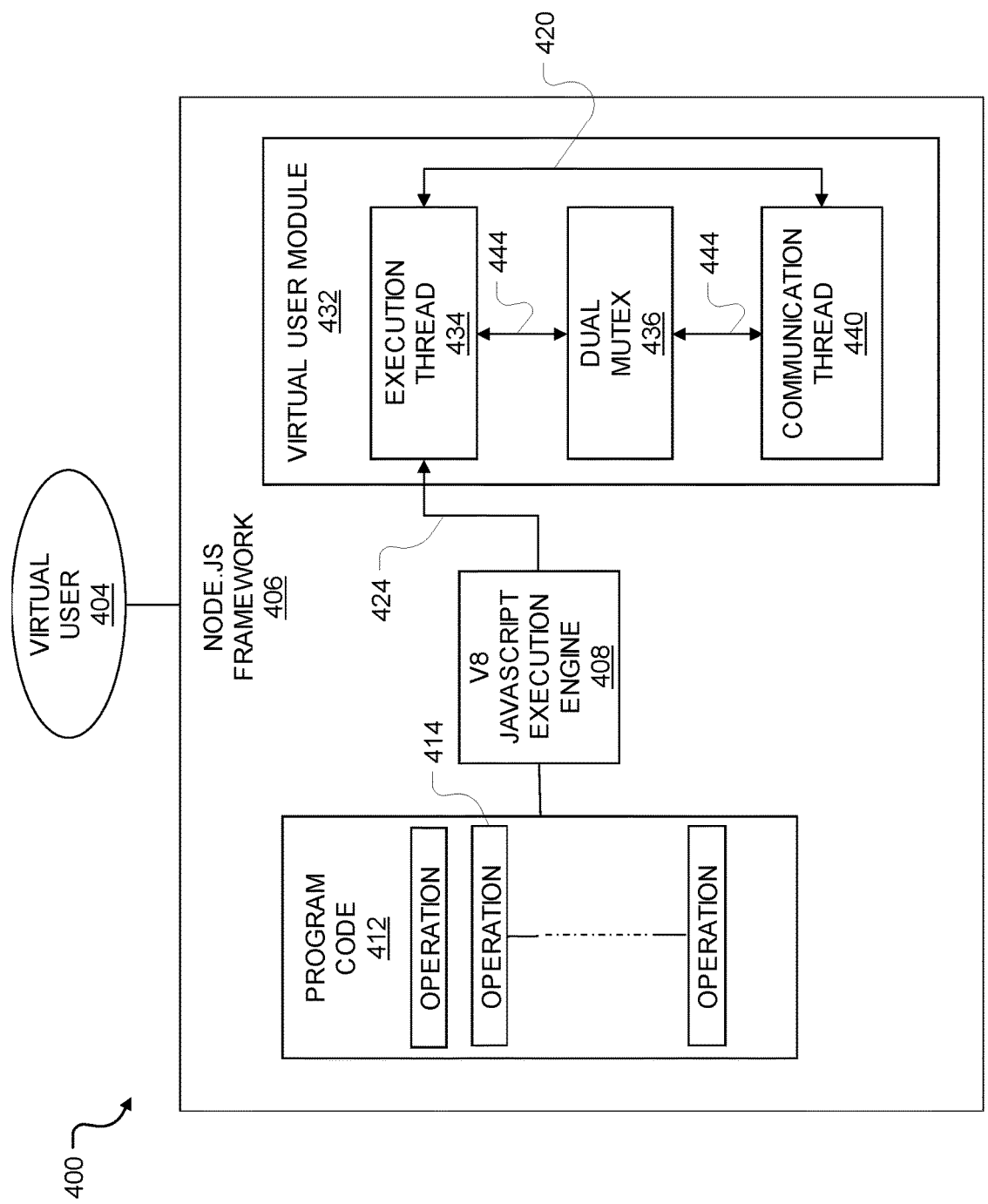
FIG. 4 is a block diagram of an example framework architecture providing for execution of a synchronous operation in the context of an asynchronous operational environment according to one embodiment of the present disclosure.

FIG. 4 is a block diagram of an example framework architecture providing for execution of a synchronous operation in the context of an asynchronous operational environment according to one embodiment of the present disclosure. FIG. 4 shows an example framework architecture 400 having a framework 406. The framework 406 includes an execution engine 408, program code 412 and a virtual user module 432. The execution engine 408 can be a V8 JavaScript execution engine, such that the program code 412 can be JavaScript program code. The program code 412 includes a sequence of operations 414. The execution engine 408 can initiate execution of the operations 414 in order. The virtual user module 432 is an instance of a virtual user 404. Each instance of a virtual user includes an execution thread 434, a dual mutex 436 and a communication thread 440. As illustrated in FIG. 4, the virtual user module 432 includes execution thread 434, dual mutex 436 and communication thread 440. As discussed in greater detail below, execution thread 434 and communication thread 440 are worker threads. The instance of the virtual user 404 is associated with the execution thread 434.

Program code 412 runs within the execution thread 434 of the virtual user module 432 so that operations 414 are processed within the execution thread 434 one at a time. In other words, the program code 412 is loaded into the execution thread 434 by the V8 JavaScript execution engine 408 via the message channel 424 and then the V8 JavaScript execution engine 408 runs the program code 412 on the execution engine 408. Each operation 414 is marked as a synchronous operation, an asynchronous operation, or other operation based on predetermined conditions. The other operation is an operation that is just executed by the execution thread 434 and does not need to be delegated to the communication thread 440. If the operation 414 is a synchronous operation, a request is sent from the execution thread 434 to the communication thread 440 via the dual mutex 436 using message channel 444. At this point, the dual mutex 436 is locked such that a subsequent operation 414 is blocked from the dual mutex 436. The communication thread 440 performs the operation associated with the operation 414. The communication thread 440 performs the operation associated with operation 414 in an asynchronous manner and returns the results of the operation 414 via dual mutex 436 to the execution thread 434. For an asynchronous operation, a request is sent from the execution thread 434 to the communication thread 440 without passing to the dual mutex 436. Instead, the request is sent from the execution thread 434 to the communication thread 440 via communication line 420, which is the built in communication line that is provided by the Node.js framework 406. According to embodiments of the present disclosure, the dual mutex 436 is always locked somehow by either the execution thread 434 or the communication thread 440 because there are not appropriate times to unlock the dual mutex 436 during operations 414 as discussed in greater detail below.

Figure 5:
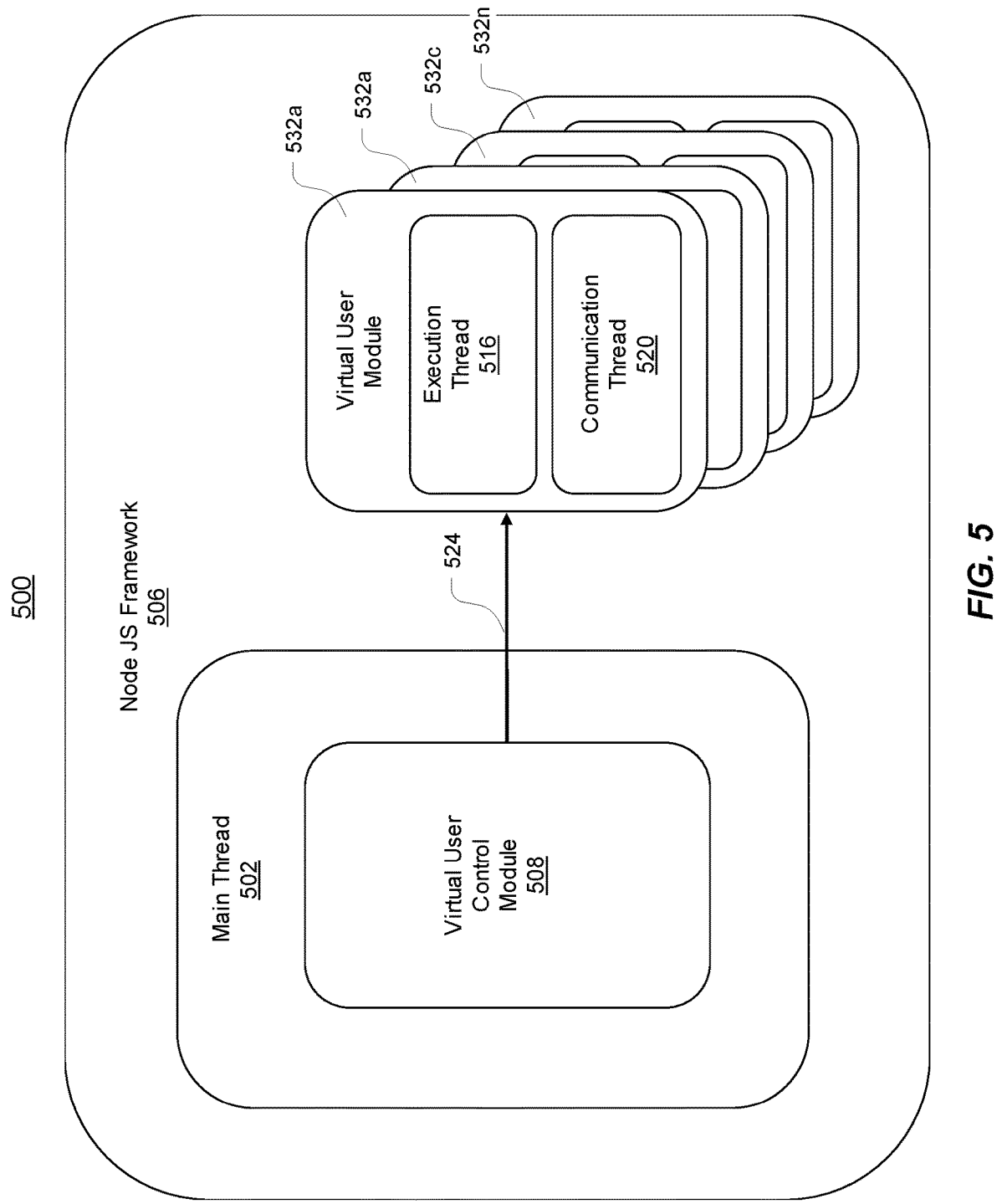
FIG. 5 is a block diagram of an example framework architecture according to one embodiment of the present disclosure.

FIG. 5 is a block diagram of an example framework architecture according to one embodiment of the present disclosure. FIG. 5 shows an example framework architecture 500 having a Node.Js framework 506. The Node.Js framework 506 includes a virtual user control module 508 running within a main thread 502 and virtual user modules 532a-532n running outside of the main thread 502. Each virtual user is represented by virtual user modules 532a-532n. Each of the virtual user modules 532a-532n includes an execution thread 516 and a communication thread 520. For example, virtual user module 532a includes execution thread 534a and communication thread 540a. Although not illustrated in FIG. 5, a dual mutex and a message channel is included with each virtual user module 532a-532n. Communication from virtual user control module 508 to the virtual user modules 532a-532n is performed over message channel 524.

Figure 6:
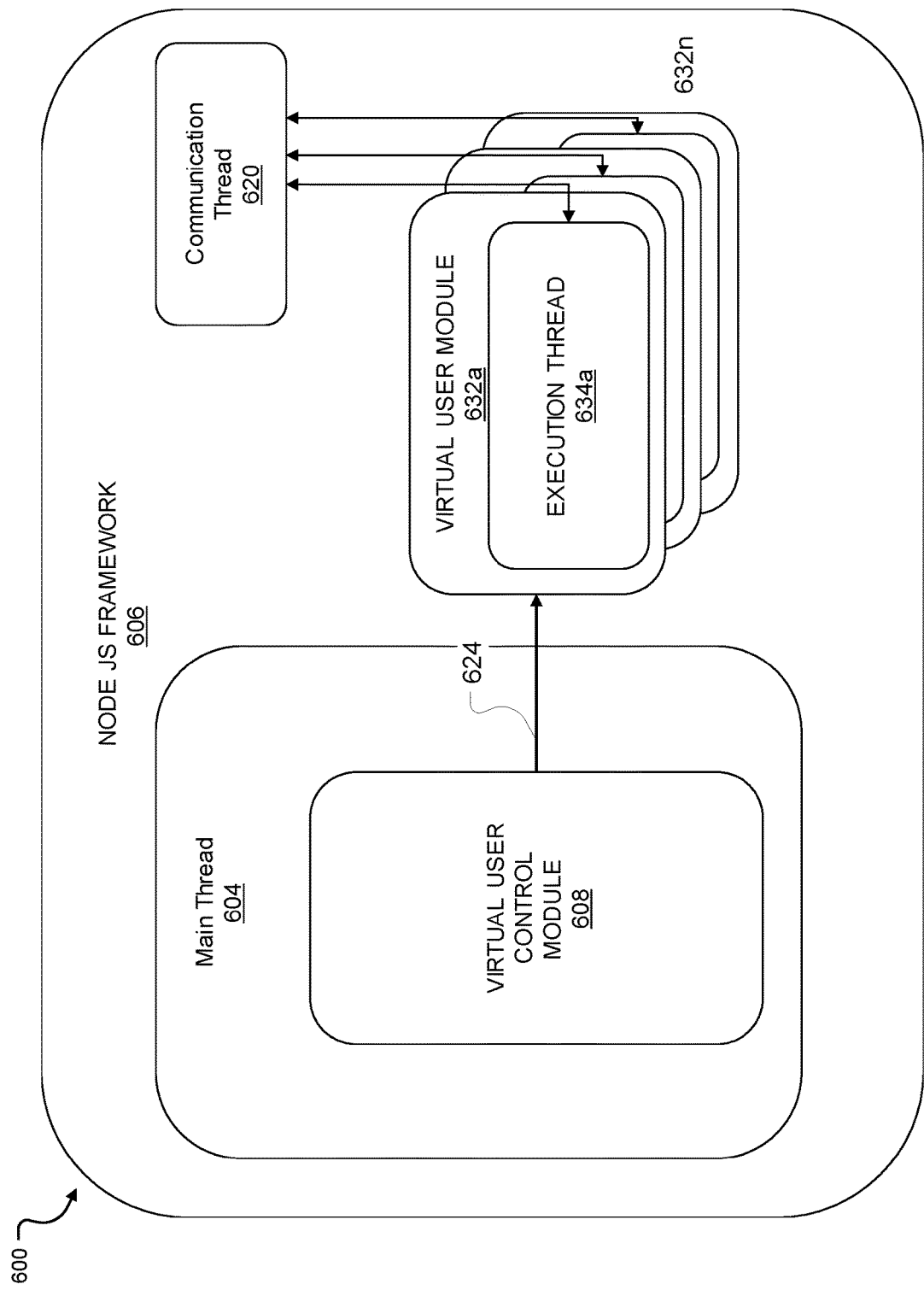
FIG. 6 is a block diagram of an alternative example framework architecture according to one embodiment of the present disclosure.

FIG. 6 is a block diagram of an alternative example framework architecture according to one embodiment of the present disclosure. FIG. 6 shows an example framework architecture 600 having a Node.Js framework 606. The Node.Js framework 606 includes a virtual user control module 608 running within a main thread 604 and virtual user modules 632a-632n running outside main thread 604. Each virtual users is represented by virtual user modules 632a-632n. As compared with the example framework architecture 500 illustrated in FIG. 5, each of the virtual user modules 632a-632n includes an execution thread 634a-634n. For example, virtual user module 632a includes execution thread 634a. The virtual user modules 632a-632n share one communication thread 640. Although not illustrated in FIG. 6, a dual mutex and a message channel is included with each of the virtual user modules 632a-632n or shared by each of the virtual user modules 632a-632n Communication from virtual user control module 608 to the execution threads 634a-634n of the virtual user modules 632a-632n is performed over message channel 624.

Figure 7:
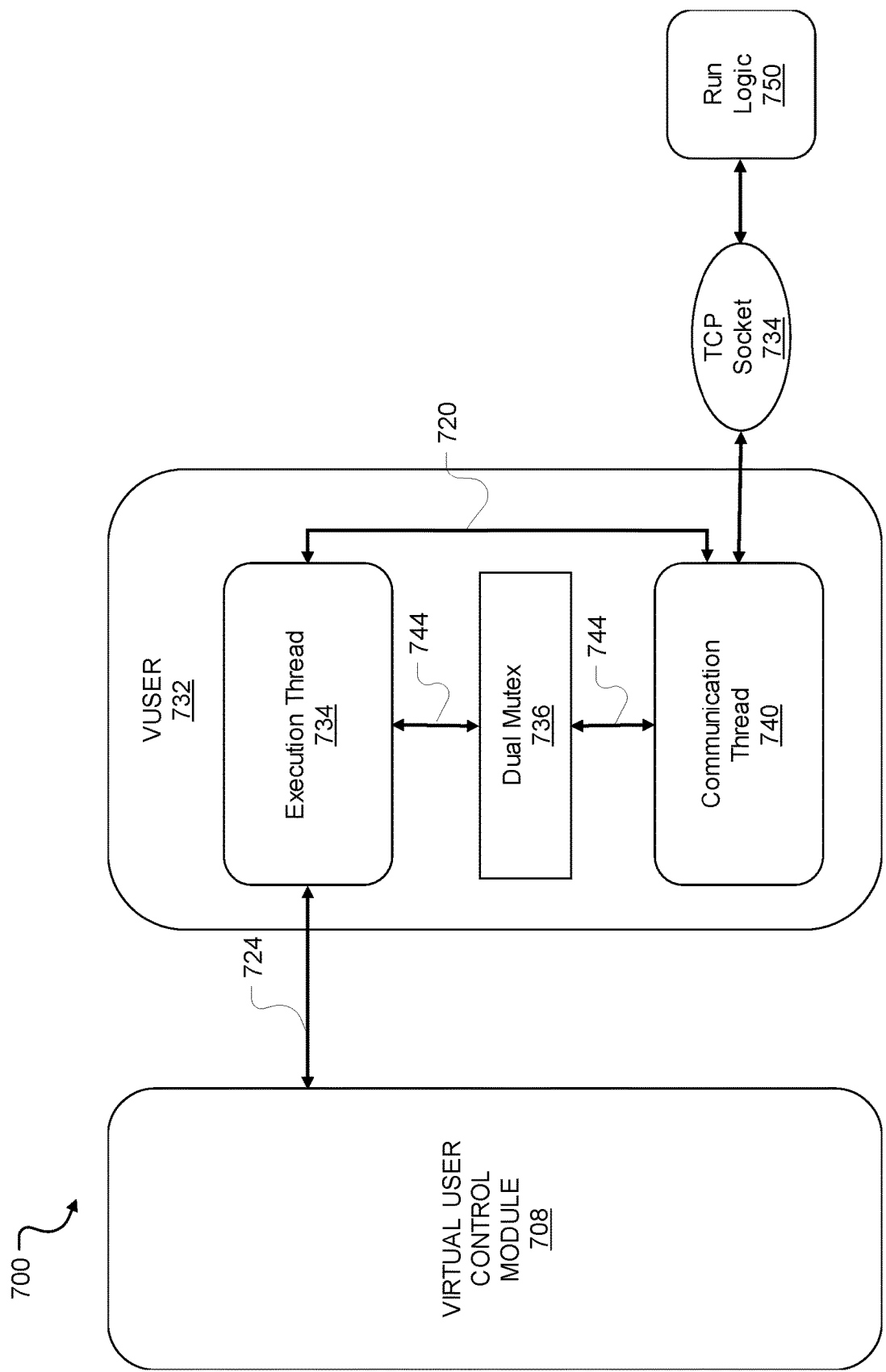
FIG. 7 is a block diagram of a synchronous operation in an asynchronous operational environment according to one embodiment of the present disclosure.

FIG. 7 is a block diagram of a synchronous operation in the context of an asynchronous operational environment according to one embodiment of the present disclosure. FIG. 7 illustrates virtual user control module 708 and virtual user module 732 communicating over message channel 724. Message channel 724 communicates with the execution thread 734 of virtual user module 732. Execution thread 734 and communication thread 740 communicate with each other through dual mutex 736 (described in greater detail in FIG. 8) via message channel 744. In other words, the execution and the communication in the virtual user module 732 is performed within the worker threads (the execution thread 734 and the communication thread 740) themselves using the dual mutex 736. The communication thread 740 communicates with the TCP socket 734 which communicates with the run logic 750.

According to one embodiment of the present disclosure, a main thread sends control commands such as start/stop/run stage but does not handle any aspect of the execution of these control commands. The communication thread 740 of the virtual user module 732 performs all of the communications with the run logic 750 via the TCP socket 734, while the execution thread 734 of the virtual user module 732 is solely responsible for execution of the virtual user code (the program code 412 illustrated in FIG. 4). For asynchronous operations, however, a request is sent from the execution thread 734 to the communication thread 740 via communication line 720 without using the dual mutex 736.

Figure 8:
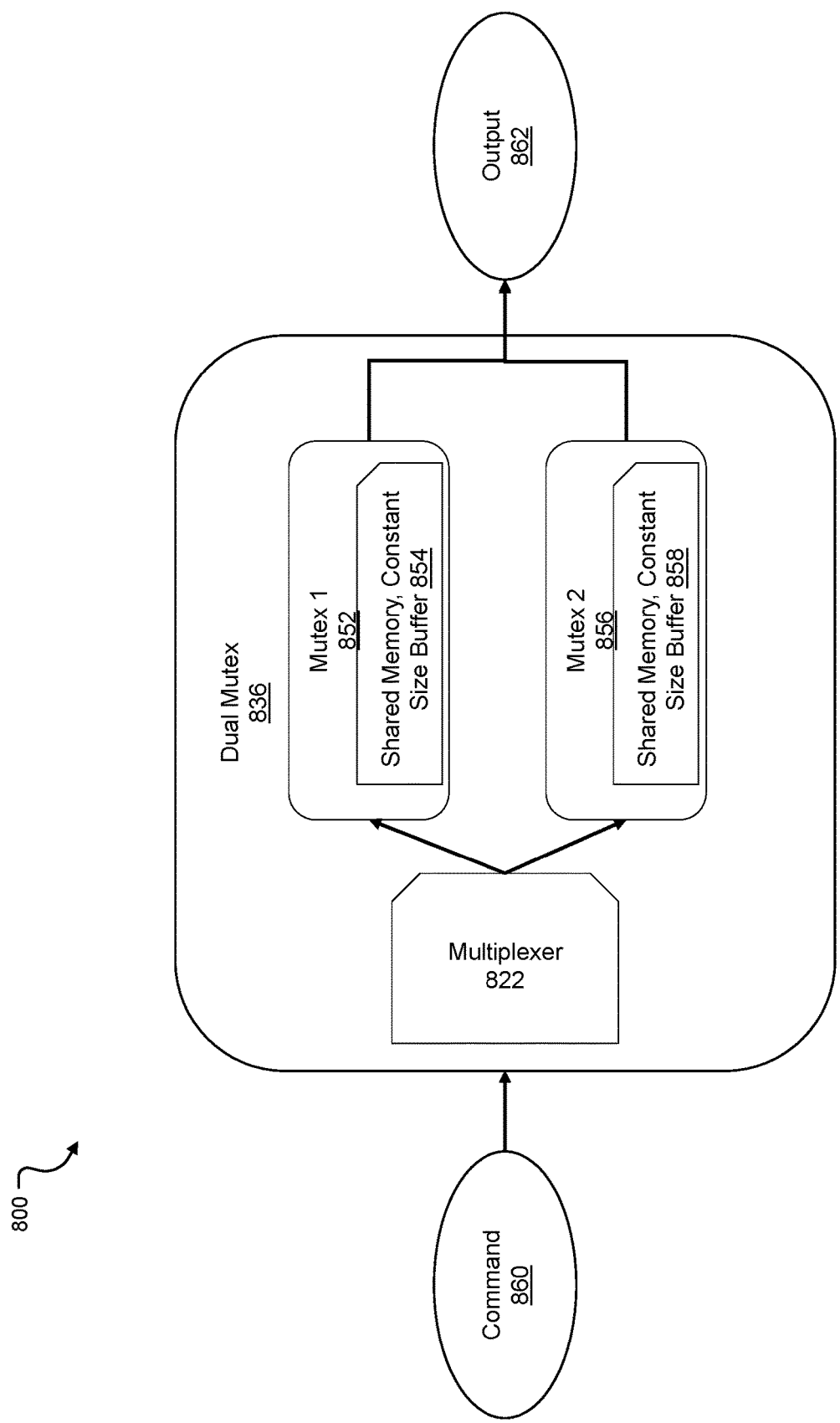
FIG. 8 is a block diagram of an example dual mutex performing synchronous communication according to one embodiment of the present disclosure.

FIG. 8 is a block diagram of an example dual mutex performing synchronous communication according to one embodiment of the present disclosure. Dual mutex 836 includes a multiplexer 822, a mutex 1 852, a mutex 2 856, data buffer 1 854 and data buffer 2 858 used for receiving commands 860 and disseminating output 862. Dual mutex 836 allows for the execution thread 734 to pause execution until the communication thread 740 is finished with a full asynchronous send/receive cycle with the run logic 750 as illustrated in FIG. 7. One of the mutex 1 852 and the mutex 2 856 is active and the other is passive. The designation of active and passive for the of the mutex 1 852 and mutex 2 856 may be swapped during operations, but one is always designated as passive while the other is designated as active Mutex 1 852 includes data buffer 1 854 and mutex 2 856 includes data buffer 2 858. Each of the data buffer 1 854 and the data buffer 2 858 has a constant size buffer which can be locked for writing operations and for reading operations. Once a buffer is locked for a reading operation or a writing operation, if another thread tries to lock either of the mutexes (mutex 1 852 or mutex 2 856) for the same operation, the thread will get stuck until the mutex is unlocked by the locking thread for the respective operation (read operation/write operation).

Unlike standard read operation/write operation locks, locking the buffer for a writing operation does not prevent locking for the reading operation (i.e., these are just names for two types of locks with no relation between them). Since Node.js does not natively support synchronous communication, the dual mutex data structure implements synchronous transmission of data via the double buffer communication mechanism.

Figure 9:
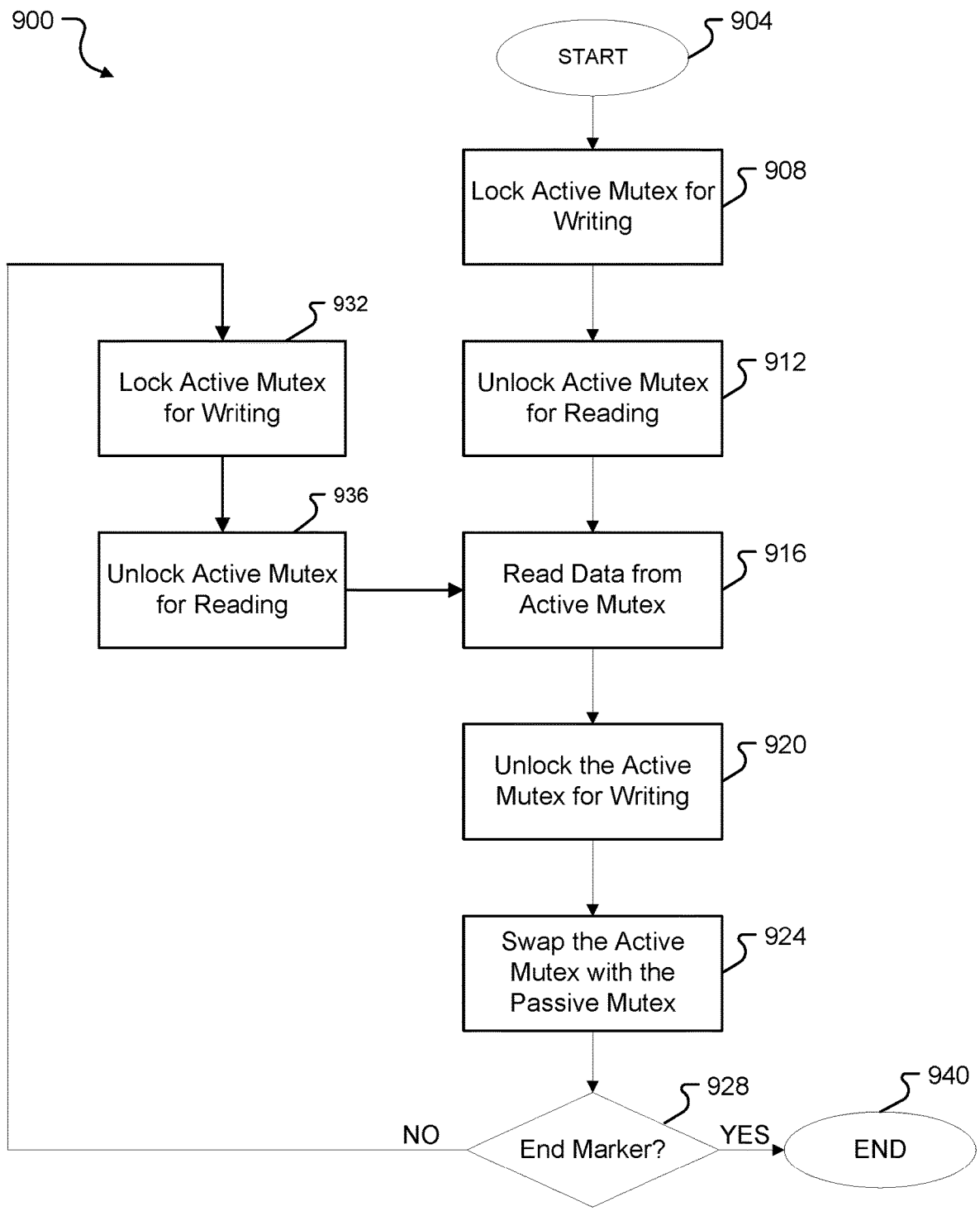
FIG. 9 is a flowchart illustrating an example process for the execution thread according to one embodiment of the present disclosure.

FIG. 9 is a flowchart illustrating an example process for the execution thread according to one embodiment of the present disclosure. While a general order for the steps of the process 900 for the operation of the execution thread is shown in FIG. 9, the process 900 can include more or fewer steps or can arrange the order of the steps differently than those shown in FIG. 9. Further, two or more steps may be combined into one step. Generally, the process 900 starts with a START operation 904 and ends with an END operation 940. The process 900 can be executed on a set of computer-executable instructions executed by a data processing system and encoded or stored on a computer readable medium. Herein, the process 900 shall be explained with reference to systems and components, modules, software, data structures, user interfaces, etc. described above.

Moreover, process 900 can be implemented as a non-statutory computer-readable data storage medium storing instructions that a processor executes. Process 900 is described in relation to the example frameworks 400-600 illustrated in FIGS. 4-6 as well as the block diagrams illustrated in FIGS. 7 and 8 for descriptive clarity but is applicable to other types of architectures as well.

Process 900 may start at START operation 904 and proceed to step 908 where the controller upon receiving a message at an initialization stage, locks the active mutex for writing. After locking the active mutex for writing at step 908, process 900 proceeds to step 912 where the controller unlocks the active mutex for reading. After the initialization stage ends, process 900 proceeds to step 916 where the controller receives the message and reads data from the active mutex. After reading the data from the active mutex at step 916, process 900 proceeds to step 920 where the controller unlocks the active mutex for writing. After unlocking the active mutex for writing in step 920, process 900 proceeds to step 924 where the controller swaps the active mutex with the passive mutex. After swapping the active mutex with a passive mutex at step 924, process 900 proceeds to decision step 928 to determine if the read data contains an end marker. If the read data contains an end marker at decision step 928 (YES), process 900 ends at END operation 940. If the read data does not contain an end marker at decision step 928 (NO), process 900 proceeds to step 932, where the controller locks the active mutex for writing. After locking the active mutex for writing in step 932, process 900 proceeds to step 936 where the controller unlocks the active mutex for reading. After unlocking the active mutex for reading in step 936, process 900 returns to step 916.

Figure 10:
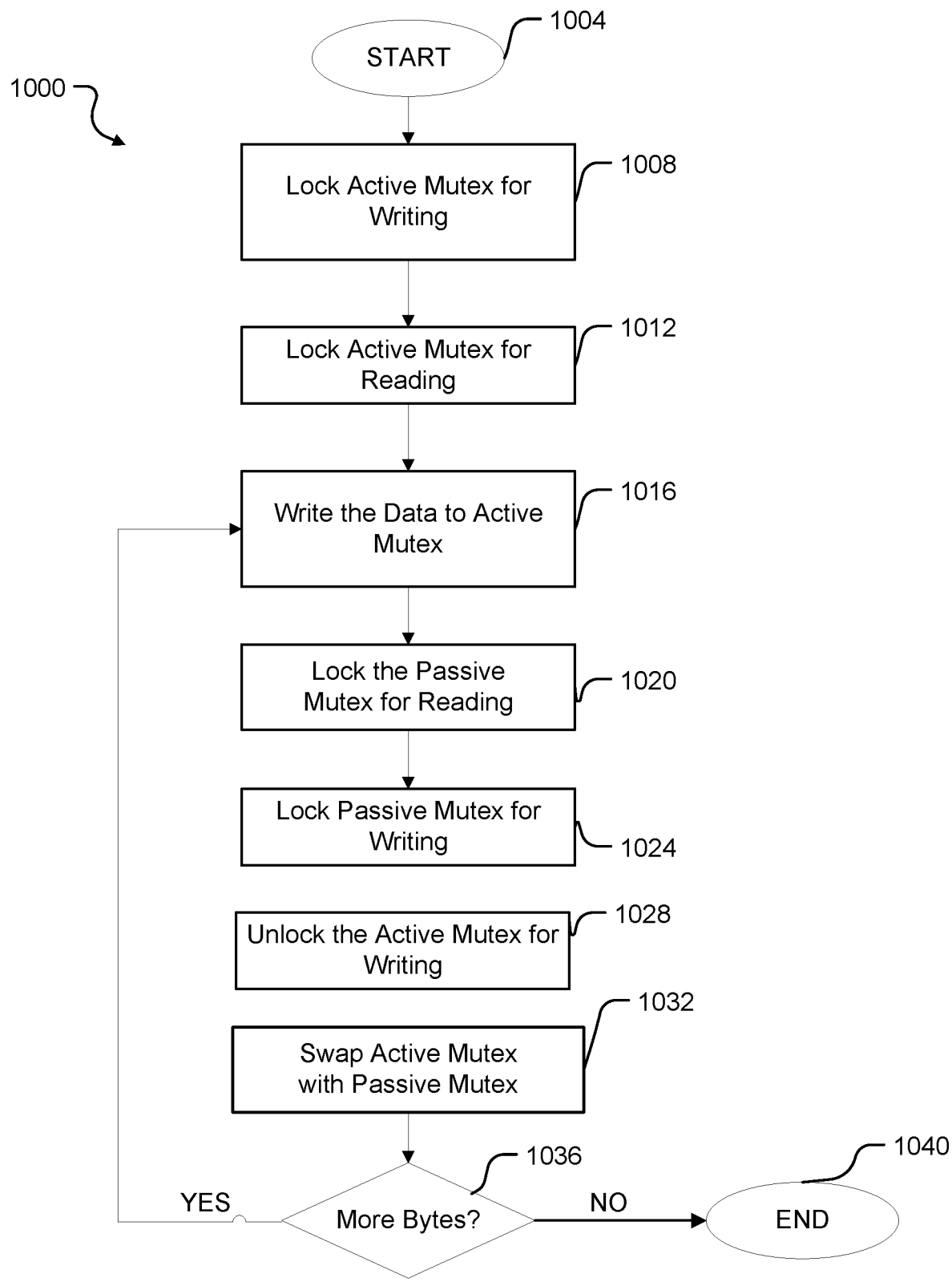
FIG. 10 is a flowchart illustrating an example process for the communication thread according to one embodiment of the present disclosure.

FIG. 10 is a flowchart illustrating an example process for the operation of the communication thread according to one embodiment of the present disclosure. While a general order for the steps of the process 1000 for the operation of the communication thread is shown in FIG. 10, the process 1000 can include more or fewer steps or can arrange the order of the steps differently than those shown in FIG. 10. Further, two or more steps may be combined into one step. Generally, the process 1000 starts with a START operation 1004 and ends with an END operation 1040. The process 1000 can be executed on a set of computer-executable instructions executed by a data processing system and encoded or stored on a computer readable medium. Herein, the process 1000 shall be explained with reference to systems and components, modules, software, data structures, user interfaces, etc. described above. Moreover, process 1000 can be implemented as a non-statutory computer-readable data storage medium storing instructions that a processor executes. Process 1000 is described in relation to the example frameworks 400-600 illustrated in FIGS. 4-6 as well as the block diagrams illustrated in FIGS. 7 and 8 for descriptive clarity but is applicable to other types of architectures as well.

Process 1000 may start at START operation 1004 and proceed to step 1008 where at an initialization stage, the controller locks the active mutex for writing. After locking the active mutex for writing at step 1008, process 1000 proceeds to step 1012 where the controller locks the active mutex for reading. After the initialization stage ends and upon a message being received from the communication port (i.e., message channel from the execution thread and the communication thread), process 1000 proceeds to step 1016 where the controller writes the data to the active mutex. After writing the data to the active mutex at step 1016, process 1000 proceeds to step 1020 where the controller locks the passive mutex for reading. After locking the passive mutex for reading in step 1020, process 1000 proceeds to step 1024 where the controller locks the passive mutex for writing. After locking the passive mutex for writing in step 1024, process 1000 proceeds to step 1028 where the controller unlocks the active mutex for writing. After unlocking the active mutex for writing in step 1028, process 1000 proceeds to step 1032 where the controller swaps the active mutex with the passive mutex. After swapping the active mutex with the passive mutex at step 1032, process 1000 proceeds to decision step 1036 to determine if there are any more bytes on the communication port. If there are no more bytes on the communication port at decision step 1036 (NO), process 1000 ends at END operation 1040. If there are more bytes on the communication port at decision step 1036 (YES), process 1000 returns to step 1016.

Figure 11:
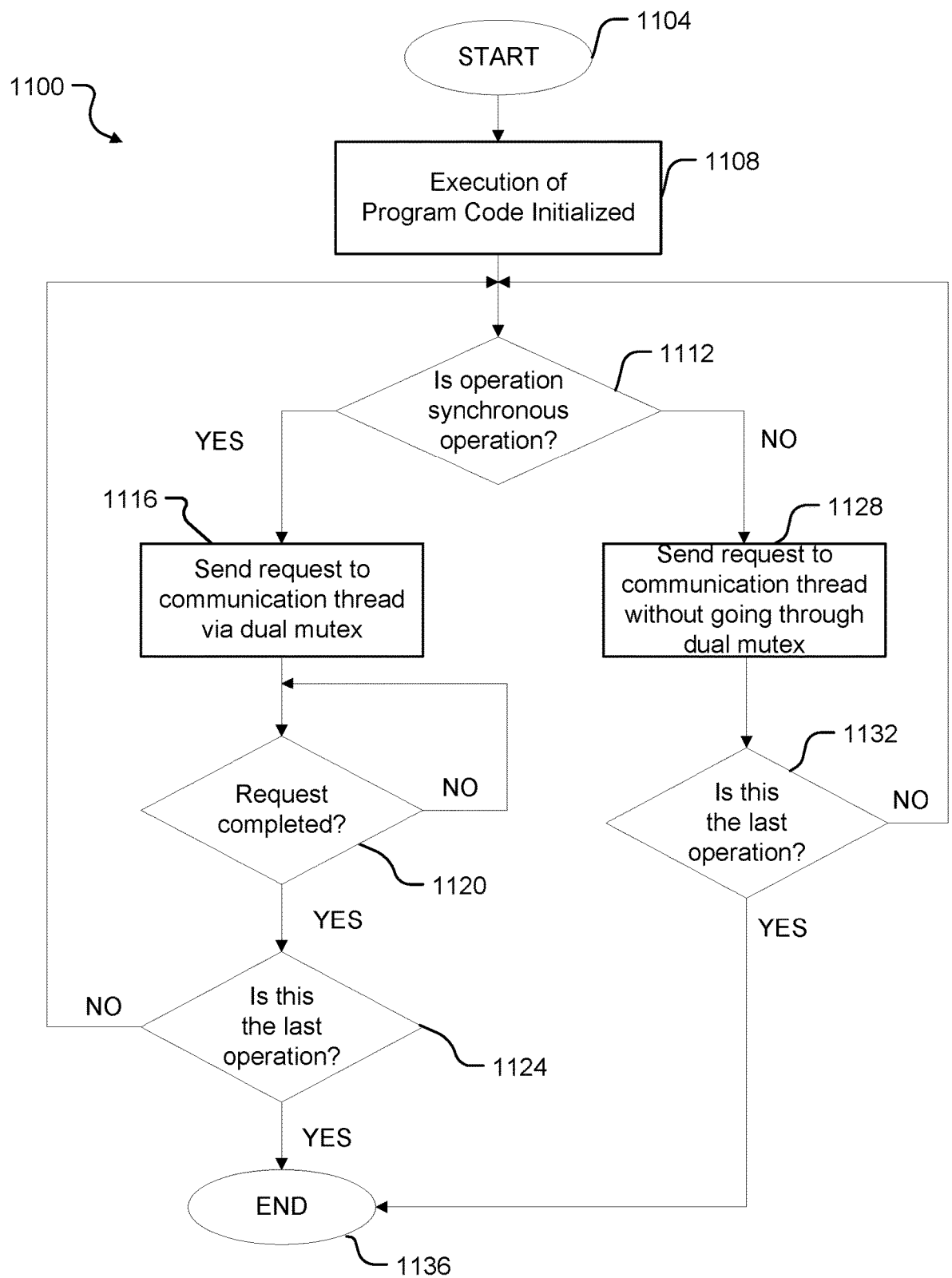
FIG. 11 is a flowchart illustrating an example process for execution of a synchronous operation in the context of an asynchronous operational environment according to one embodiment of the present disclosure.

FIG. 11 is a flowchart illustrating an example process for execution of a synchronous operation in the context of an asynchronous operational environment according to one embodiment of the present disclosure. While a general order for the steps of the process 1100 for synchronous execution of a synchronous operation method in the context of an asynchronous virtual user execution/communication thread module is shown in FIG. 11, the process 1100 can include more or fewer steps or can arrange the order of the steps differently than those shown in FIG. 11. Further, two or more steps may be combined into one step. Generally, the process 1100 starts with a START operation 1104 and ends with an END operation 1136. The process 1100 can be executed on a set of computer-executable instructions executed by a data processing system and encoded or stored on a computer readable medium. Herein, the process 1100 shall be explained with reference to systems and components, modules, software, data structures, user interfaces, etc. described above. Moreover, process 1100 can be implemented as a non-statutory computer-readable data storage medium storing instructions that a processor executes. Process 1100 is described in relation to the example frameworks 400-600 illustrated in FIGS. 4-6 as well as the block diagrams illustrated in FIGS. 7 and 8 for descriptive clarity but is applicable to other types of architectures as well.

Process 1100 may start at START operation 1104 and proceed to step 1108 where the execution of the program code is initialized. This allows the virtual user module to begin executing the program code to handle events/operations by the program code. After the program code is initialized at step 1108, process 1100 proceeds to decision step 1112 where it is determined if a present operation of the program code 412 is a synchronous operation. If the present operation is a synchronous operation (YES) at decision step 1112, process 1100 proceeds to step 1116 where a request is sent from the execution thread via the dual mutex to the communication thread to perform the operation Sending the request from the execution thread to the communication thread blocks subsequent operations from being executed thread until a response for the request has been completed by the communication thread. After the request is sent to the communication thread at step 1116, process 1100 proceeds to decision step 1120 where it is determined if the request has been completed by the communication thread. The dual mutex is locked so that a next operation is blocked when the communication thread is still handling the present operation. In other words, there are more bytes of data on the message channel from the execution thread to the communication channel. If there are no more bytes on the communication channel (the request from the communication thread has been completed) (YES) at decision step 1120, process 1100 proceeds to decision step 1124 where it is determined if the present operation is the last operation. If the present operation is the last operation (YES) at decision step 1124, process 1100 ends at END operation 1136. If the present operation is not the last operation (NO) at decision step 1124, process 1100 returns to step 1112 where it is determined whether a next operation is a synchronous operation. If there are more bytes of data on the message channel (the request from the communication thread has not been completed) (NO) at decision step 1120, process 1100 returns to decision step 1120 and continuously returns to decision step 1120 until the request from the communication thread has been completed. If the present operation is not a synchronous operation (NO) at decision step 1112, process 1100 proceeds to step 1128 where a request for the present operation is sent from the execution thread to the communication thread through the communication line that is provided by the Node.js framework and not via the dual mutex to perform the operation Since the operation is an asynchronous operation, a subsequent operation is executed by the execution thread without waiting for the request from the present communication thread to be completed. After the request is sent to the communication thread at step 1128, process 1100 proceeds to decision step 1132 where it is determined if the present operation is the last operation. If the present operation is the last operation (YES) at decision step 1132, process 1100 ends at END operation 1136. If the present operation is not the last operation (NO) at decision step 1132, process 1100 returns to step 1112 where it is determined whether a next operation is a synchronous operation. The process 1100 continues until there are no more operations to handle for the program code.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for execution of a synchronous operation in an asynchronous operational environment, comprising:
receiving, by a processor, a first operation from program code executing within the asynchronous operational environment, the program code being run on an execution thread and a communication thread provided within a virtual user module representing an instance of a virtual user,
wherein the execution thread and the communication thread communicate through a message channel including a dual mutex and a communication line with the communication line being separate from the message channel;
determining, by the processor, if the first operation is a synchronous operation; and
if the first operation is a synchronous operation, sending a request from the execution thread to the communication thread via the message channel and the dual mutex to perform the first operation and blocking execution of a subsequent operation by locking the dual mutex until a response to the request from the communication thread for the first operation has been completed and returned to the execution thread.

2. The method for execution of a synchronous operation in an asynchronous operational environment according to claim 1, wherein if the first operation is not a synchronous operation, sending a request from the execution thread to the communication thread via the communication line to perform the first operation and allowing execution of a subsequent operation, regardless if a request from the communication thread of the first operation has been completed.

3. The method for execution of a synchronous operation in an asynchronous operational environment according to claim 1, wherein the dual mutex includes an active mutex including a first data buffer and a passive mutex including a second data buffer, wherein the first data buffer and the second data buffer comprise a dual data buffer for the execution thread and the communication thread for the synchronous operation, and wherein the dual data buffer is always locked during the synchronous operation.

4. The method for execution of a synchronous operation in an asynchronous operational environment according to claim 1, further comprising:
receiving on the message channel from the execution thread to the communication thread, data from the request;
reading, by the processor, the data from an active mutex of the execution thread;
unlocking, by the processor, the active mutex of the execution thread for writing;
swapping, by the processor, the active mutex and a passive mutex of the execution thread;
locking, by the processor, the active mutex of the execution thread for writing; and
unlocking, by the processor, the active mutex of the execution thread for reading.

5. The method for execution of a synchronous operation in an asynchronous operational environment according to claim 4, further comprising locking, by the processor, the active mutex for the execution thread for writing and unlocking the active mutex for the execution thread for reading at an initialization stage.

6. The method for execution of a synchronous operation in an asynchronous operational environment according to claim 1, further comprising:
receiving on the message channel from the execution thread to the communication thread data of the request;
writing, by the processor, the data of the request into an active mutex of the communication thread;
locking, by the processor, a passive mutex of the communication thread for reading and writing;
unlocking, by the processor, the active mutex of the communication thread for writing;
swapping, by the processor, the active mutex with the passive mutex of the communication thread; and
outputting, by the processor, the data of the request to a shared resource.

7. The method for execution of a synchronous operation in an asynchronous operational environment according to claim 6, further comprising locking, by the processor, the active mutex for the communication thread for reading and writing at an initialization stage.

8. A system, comprising:
a processor; and
a memory storing instructions executable by the processor to:
receive a first operation from program code executing within an asynchronous operational environment, the program code being run on an execution thread and a communication thread provided within a virtual user module representing an instance of a virtual user,
wherein the execution thread and the communication thread communicate through a message channel including a dual mutex and a communication line with the communication line being separate from the message channel;
determine if the first operation is a synchronous operation; and
if the first operation is a synchronous operation, send a request from the execution thread to the communication thread via the message channel and the dual mutex to perform the first operation and block execution of a subsequent operation by locking the dual mutex until a response to the request from the communication thread for the first operation has been completed and returned to the execution thread.

9. The system according to claim 8, wherein the instructions are executable by the processor to further send a request from the execution thread to the communication thread via the communication line to perform the first operation and allowing execution of a subsequent operation, regardless if a request from the communication thread of the first operation has been completed, if the first operation is not a synchronous operation.

10. The system according to claim 8, wherein the dual mutex includes an active mutex including a first data buffer and a passive mutex including a second data buffer, wherein the first data buffer and the second data buffer comprise a dual data buffer for the execution thread and the communication thread for the synchronous operation, and wherein the dual data buffer is always locked during the synchronous operation.

11. The system according to claim 8, wherein the instructions are executable by the processor to further:
receive on the message channel from the execution thread to the communication thread, data from the request;
read the data from an active mutex of the execution thread;
unlock the active mutex of the execution thread for writing;
swap the active mutex with a passive mutex of the execution thread;
lock the active mutex of the execution thread for writing; and
unlock the active mutex of the execution thread for reading.

12. The system according to claim 11, wherein the instructions are executable by the processor to lock the active mutex for the execution thread for writing and unlock the active mutex for the execution thread for reading at an initialization stage.

13. The system according to claim 8, wherein the instructions are executable by the processor to further:
receive on the message channel from the execution thread to the communication thread, data from the request;
write the data into an active mutex of the communication thread;
lock a passive mutex of the communication thread for reading and writing;
unlock the active mutex of the communication thread for writing;
swap the active mutex with the passive mutex of the communication thread; and
output the data to a shared resource.

14. The system according to claim 13, wherein the instructions are executable by the processor to further lock the active mutex for the communication thread for reading and writing at an initialization stage.

15. A non-transitory computer-readable data storage medium storing instructions executable by a processor to:
receive a first operation from program code executing within an asynchronous operational environment, the program code being run on an execution thread and a communication thread provided within a virtual user module representing an instance of a virtual user,
wherein the execution thread and the communication thread communicate through a message channel including a dual mutex and a communication line with the communication line being separate from the message channel;
determine if the first operation is a synchronous operation; and
if the first operation is a synchronous operation, send a request from the execution thread to the communication thread via the message channel and the dual mutex to perform the first operation and block execution of a subsequent operation by locking the dual mutex until a response to the request from the communication thread for the first operation has been completed and returned to the execution thread.

16. The non-transitory computer-readable data storage medium according to claim 15, wherein the instructions are executable by the processor to further send a request from the execution thread to the communication thread via the communication line to perform the first operation and allowing execution of a subsequent operation, regardless if a request from the communication thread of the first operation has been completed, if the first operation is not a synchronous operation.

17. The non-transitory computer-readable data storage medium according to claim 15, wherein the dual mutex includes an active mutex including a first data buffer and a passive mutex including a second data buffer, wherein the first data buffer and the second data buffer comprise a dual data buffer for the execution thread and the communication thread for the synchronous operation, and wherein the dual data buffer is always locked during the synchronous operation.

18. The non-transitory computer-readable data storage medium according to claim 15, wherein the instructions are executable by the processor to further:
receive on the message channel from the execution thread to the communication thread, data from the request;
read the data from an active mutex of the execution thread;
unlock the active mutex of the execution thread for writing;
swap the active mutex with a passive mutex of the execution thread;
lock the active mutex of the execution thread for writing; and
unlock the active mutex of the execution thread for reading.

19. The non-transitory computer-readable data storage medium according to claim 18, wherein the instructions are executable by the processor to further lock the active mutex for the execution thread for writing and unlock the active mutex for the execution thread for reading at an initialization stage.

20. The non-transitory computer-readable data storage medium according to claim 15, wherein the instructions are executable by the processor to further:
receive on the message channel from the execution thread to the communication thread, data from the request;
write the data into an active mutex of the communication thread;
lock a passive mutex of the communication thread for reading and writing;
unlock the active mutex of the communication thread for writing;
swap the active mutex with the passive mutex of the communication thread; and
output the data to a shared resource.

* * * * *